United States Patent [19]

Tanaka et al.

[11] Patent Number: 5,145,542
[45] Date of Patent: Sep. 8, 1992

[54] METHOD AND APPARATUS FOR PRODUCING A BIASED BELT SHEET

[75] Inventors: Yukihisa Tanaka; Kouji Tsukamoto; Katsuaki Shinoda, all of Toyota, Japan

[73] Assignee: Sumitomo Rubber Industries, Ltd., Hyogo, Japan

[21] Appl. No.: 626,834

[22] Filed: Dec. 13, 1990

[30] Foreign Application Priority Data

Dec. 21, 1989 [JP] Japan ................... 1-333127

[51] Int. Cl.$^5$ .................. B29D 30/38; B32B 31/10; B32B 31/18
[52] U.S. Cl. ........................... 156/159; 156/266; 156/507; 156/512
[58] Field of Search ............. 156/157, 159, 264, 266, 156/502, 507, 512, 406.4

[56] References Cited

U.S. PATENT DOCUMENTS

| | | | |
|---|---|---|---|
| 2,962,083 | 11/1960 | Hasselquist | 156/512 |
| 3,141,805 | 7/1964 | Gough et al. | 156/512 |
| 3,192,094 | 6/1965 | Phillips et al. | 156/512 |
| 3,616,085 | 10/1971 | Printz | 156/512 |
| 3,888,717 | 6/1975 | Koyama et al. | 156/159 |
| 4,025,384 | 5/1977 | Shiozaki et al. | 156/159 |
| 4,337,112 | 6/1982 | Hollis | 156/512 |

FOREIGN PATENT DOCUMENTS

1218238 1/1971 United Kingdom .
1778551 10/1971 United Kingdom .

*Primary Examiner*—Michael W. Ball
*Assistant Examiner*—Steven D. Maki
*Attorney, Agent, or Firm*—Birch, Stewart, Kolasch & Birch

[57] ABSTRACT

A method for producing a biased belt sheet includes the steps of cutting a longitudinally extending rubbered strip, having a number of cords embedded therein extending parallel to the longitudinal direction of the strip, at a desired angle with respect to the longitudinal direction into unit sheets of a desired length, each being in the form of a parallelogram, on a cutting conveyor by cutting means, transferring in turn each unit sheet from the cutting conveyor to a sheet joining conveyor by holding means and transfer means, positioning the unit sheet so that the cut edges of the unit sheet become parallel to the moving direction of the sheet joining conveyor, and adhering the forward end of the unit sheet to the rearward end of the preceding unit sheet to form a continuous belt sheet of biased cord material.

6 Claims, 11 Drawing Sheets

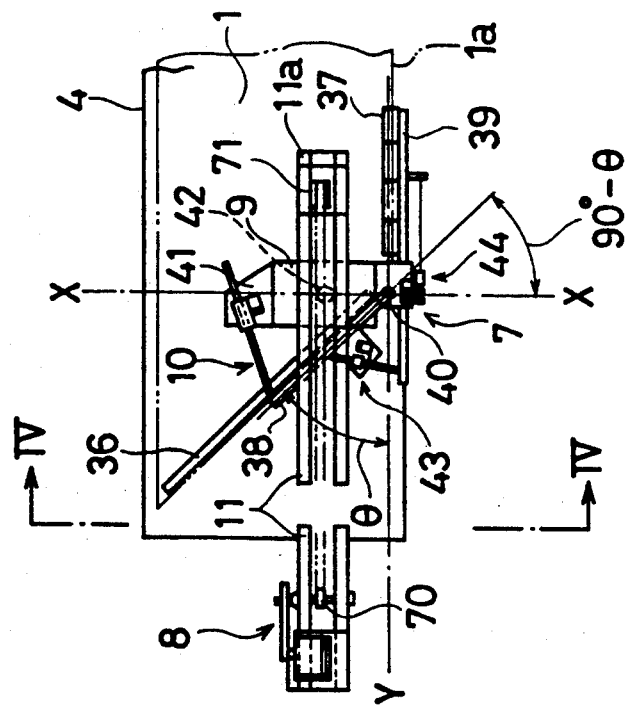
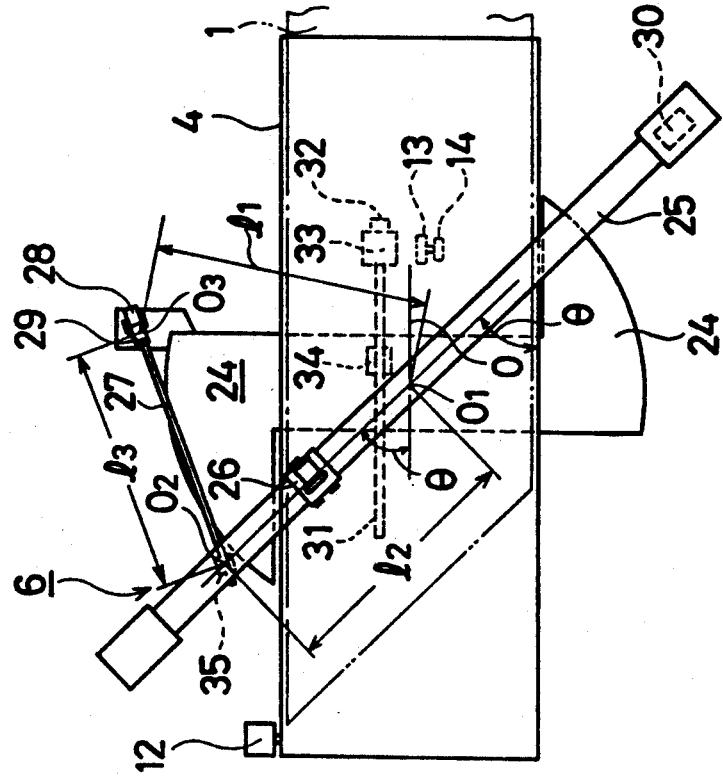

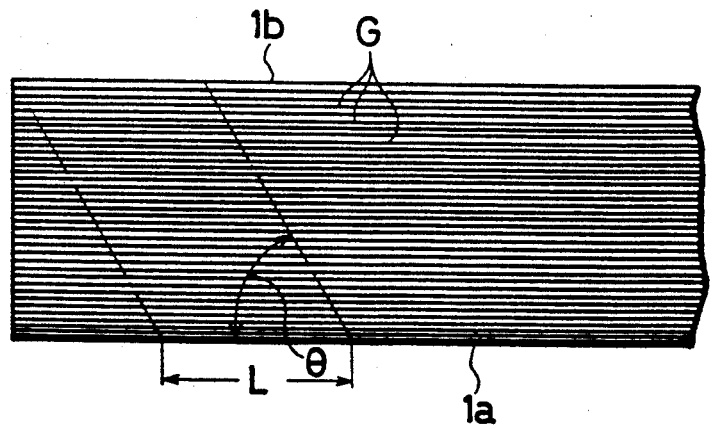
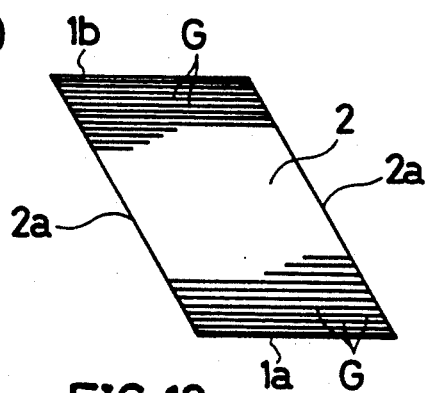
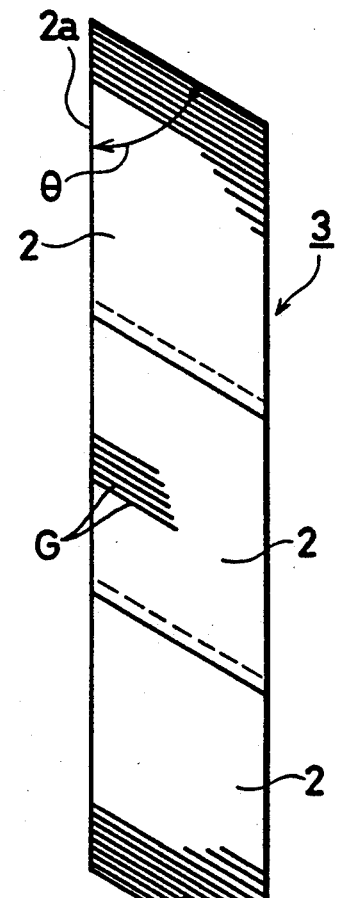
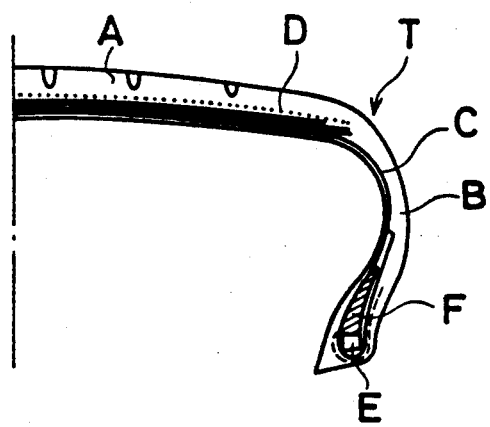
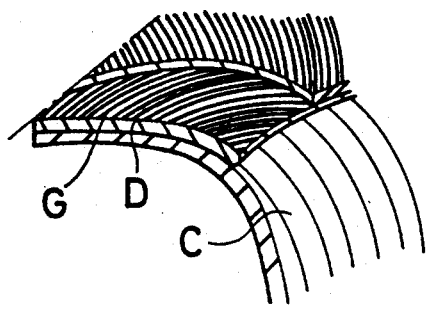

METHOD AND APPARATUS FOR PRODUCING A BIASED BELT SHEET

BACKGROUND OF THE INVENTION

The present invention relates to a method and apparatus for producing a biased belt sheet having cords embedded therein which are oblique with respect to the longitudinal direction of the belt.

A vehicle tire as shown in FIG. 12, includes an annular tread A and a side wall B, a carcass ply C and a breaker D radially outwardly of the carcass ply C. The edges of the carcass ply C are turned up around bead cores E. Further, on the outside of the turned-up portions of the carcass ply C are provided. The breaker D and chafers F, as illustrated in FIG. 13, has belt plies or sheets having a number of organic or inorganic fiber cords G embedded therein. The cords lie obliquely with respect to a center line of the sheet.

A conventional method of producing a biased belt sheet is illustrated in FIGS. 9 to 11. First, a short unit sheet in the form of a parallelogram as shown in FIG. 10 is produced by cutting a rubbered belt strip in which fiber cords G are embedded in parallel to a longitudinal direction at a desired angle with respect to the longitudinal direction and at a desired length L as shown in FIG. 9. Second, unit sheets 2 are, as shown in FIG. 11, joined to one another, so as to form another belt sheet, with both the cut edges 2a ending up becoming the side edges of the new sheet. The biased belt sheet 3 thus obtained is the one in which the fiber cords G are arranged at an angle of $\theta$ with respect to the longitudinal direction.

In the conventional method, after being cut with a bias cutter, on a cutting conveyor, unit sheets are transferred to another conveyor by an operator or a robot, and joined one to another by manual operation.

The conventional method has the following problems: In the case of the manual operation, the operation efficiency is quite low; In the case of the use of robot, maintenance is very difficult and if the robot breaks down, the operation is forced to be suspended for a prolonged time.

In view of the above-mentioned problems, it is a main object of the present invention to provide a method and apparatus for producing a biased belt sheet which makes it possible to automatically join unit sheets, without using a robot, to simplify and facilitate the maintenance, and to eliminate manual operations to increase the productivity.

SUMMARY OF THE INVENTION

According to the present invention, a method for producing a biased belt sheet comprises the steps of cutting a longitudinally-extending rubbered strip, having a number of cords embedded therein extending parallel to the longitudinal direction of the strip, at a desired angle with respect to the longitudinal direction, into unit sheets of a desired length, each being in the form of a parallelogram, on a cutting conveyor by cutting means, transferring in turn each unit sheet from the cutting conveyor to a sheet joining conveyor by holding means and transfer means, positioning the unit sheet so that the cut edges of the unit sheet become parallel to the moving direction of the sheet joining conveyor, and adhering the forward end of the unit sheet to the rearward end of the preceding unit sheet to form a continuous sheet of biased cord material.

Another aspect of the invention provides an apparatus for producing a biased belt sheet comprises a cutting conveyor for feeding a longitudially-extending rubbered strip having a number of cords embedded therein extending parallel to the longitudinal direction of the strip, cutting means for cutting the rubbered strip at a desired angle with respect to the longitudinal direction into unit sheets of a desired length each in the form of a parallelogram, holding means for holding the unit sheet, moving means for moving the holding means, a sheet joining conveyor provided in a position in the vicinity of a trailing end of the cutting conveyor and intersecting the direction of movement of the cutting conveyor for joining ends of successive unit sheet to produce a continuous biased belt sheet.

Thus, in the present invention, firstly the bias angle $\theta$ is set at a desired value within a predetermined range, for example, 45 to 66 degrees. At the same time, the length, i.e., the cutting length L, is determined. Thereafter, the angle and position of the cutting means is adjusted. The holding means is adjusted in its X- and the Y-axis angles by the angle change means. The stopping position of the sheet joining conveyor is adjusted. The apparatus is started, the cutting operation is performed to cut the rubbered strip into unit sheets in the form of a desired parallelogram. The unit sheet is picked up with its cut edge and no-cut edge being sucked up by the holding means, and transferred back to the sheet joining conveyor from the cutting conveyor by the transfer means. The holding means is then rotated by a predetermined angle so that the cut edge of the unit sheet comes into the parallel position to the direction of movement of the sheet joining conveyor. Subsequently, the unit sheet is separated from the holding means and placed in a predetermined position on the sheet joining conveyor.

The sheet joining conveyor is started to move forward the unit sheet by a predetermined distance (sheet joining pitch) where the next unit sheet is awaited. On the other hand, the holding means is moved to the unit sheet holding position where the next unit sheet is taken up.

The next unit sheet is formed in the above-mentioned way, and transferred to the sheet joining conveyor where the positioning of the forward end of the next unit sheet is done and then the forward end of the next unit sheet, placed on the sheet joining conveyor and joined to the rearward end of the preceding unit sheet with a joining width. Next, the sheet joining conveyor is advanced by a predetermined distance. The joining portion of the both unit sheets is pressed by a presser roller during the forward movement. In this way, unit sheets are joined in succession to form a long biased belt sheet.

The above and other objects, features and advantages of the present invention will become more apparent from the following detailed description with reference to the accompanying drawings.

BRIEF DESCRIPTION OF THE DRAWINGS

FIG. 2 is a plan view showing cutting means;

FIG. 3 is a plan view showing suction holding means and a transfer means;

FIG. 9 is a fragmentary plan view of a rubbered strip;

FIG. 10 is a plan view of a unit or an element of sheet;

FIG. 11 is a plan view of a finished biased sheet;

FIG. 12 is a sectional view showing a construction of a tire;

FIG. 13 is a partial perspective view showing the construction of carcass cords and belts of the tire;

DETAILED DESCRIPTION OF A PREFERRED EMBODIMENT OF THE INVENTION

Figure 1:
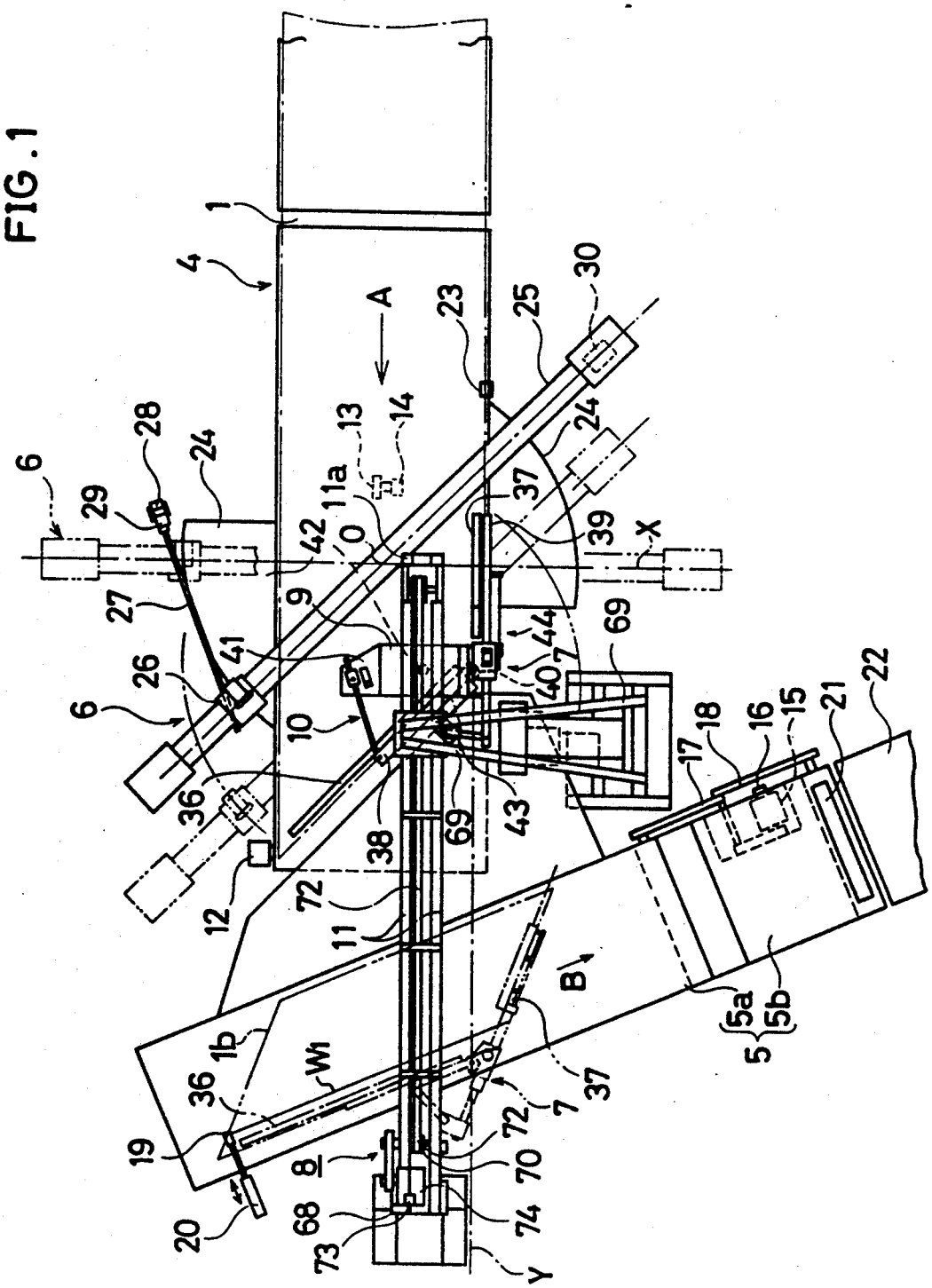
FIG. 1 is a plan view showing an overall construction of an apparatus embodying the present invention.

In FIGS. 1 to 8, indicated at 4 is a cutting conveyor, and indicated at 5 is a sheet joining conveyor. The sheet joining conveyor 5 includes a first conveyor 5a and a second conveyor 5b. The sheet joining conveyor 5 is positioned in front of the output end of the cutting conveyor 4 at an inclination (e.g. 66 degrees) with respect to the center line or axis Y (hereinafter referred to as "Y-axis") of the cutting conveyor 4. The Y-axis is the direction of movement of the cutting conveyor 4.

A cutting means 6 is disposed above the cutting conveyor 4. The cutting means 6 can be angled at various inclinations to the moving direction A of the cutting conveyor 4 and is also movable in direction A.

Indicated at 7 is suction holding means for holding a unit or element of sheet 2. Indicated at 8 is transfer means for transferring a unit sheet 2. The suction holding means 7 is attached to a carriage 9 on the transfer means 8 by a pivoting mount 10 so that the angle of the suction holding means 7 with respect to the transfer means 8 can be changed as required. The carriage 9 is slidably supported on a carriage rail 11 which is parallel to the Y-axis and crosses the sheet joining conveyor 5, with the forward end 11a of the carriage rail 11 extending to above the cutting means 6 above the cutting conveyor 4.

Indicated at 12 is a drive motor for driving the cutting conveyor 4. Indicated at 13 is a measuring roller provided with a pulse generator 14. The pulse generator 14 generates one pulse every 0.1 mm and applies feedback to the drive motor 12 so as to feed the rubbered strip 1 by a predetermined length L (cutting length).

Indicated at 15 is a drive motor for driving the joining conveyor 5. The drive motor 15 is directly connected with a pulse generator 16 to drive the first conveyor 5a and the second conveyor 5b in synchronization with each other by drive belts 17, 18.

Indicated at 19 is a photoelectric detector 19 for sensing an end edge 1b of the unit sheet 2. The photoelectric detector 19 is mounted so that it can be moved in a direction perpendicular to the direction of movement B of the sheet joining conveyor 5 by a cylinder 20. When the suction holding means 7 is retracted, the photoelectric detector 19 is retracted so as not to come into contact with the suction holding means 7. After each unit sheet 2 is joined to the previous unit sheet 2, the photoelectric detector 19 detects the end edge 1b of the unit sheet 2 and applies feedback to the pulse generator 16 to determine the required stop position to ensure a predetermined length WI of sheet between joints (see FIG. 8).

Indicated at 21 is a sheet presser roller provided at the forward end of the second conveyor 5b, and indicated at 22 is a finished sheet discharge conveyor.

Indicated at 23 is a sheet edge positioning device (E.P.D) which is disposed at the front of the cutting conveyor 4 to control a side edge 1a of the rubbered strip 1 so as to keep it parallel to the Y-axis.

The cutting means 6 includes a cutter base 24 movable in parallel to the direction of the Y-axis, a cutter rail 25 on the cutter base 24 across the cutting conveyor 4 and inclinable with respect to the moving direction A of the cutting conveyor 4, a cutter 26 traversable on the cutter rail 25, a cutter rail angle adjusting screw shaft 27, a pulse generator 28, a directly-coupled motor 29, a cutter traverse motor 30 for traversing the cutter 26, a screw shaft 31 for moving the cutter base 24, and a screw shaft drive motor 33 directly coupled with a pulse generator 32. The cutter base 24, as shown in FIG. 2, has a fixed threaded nut 34 in which the screw shaft 31 is rotatably engaged. Accordingly, when the screw shaft 31 is rotated by the motor 33, the cutter base 24 is moved in the direction of the Y-axis with the pulse generator 32 applying feedback for confirmation and control of the stop position.

A reference point 01 of the cutter rail 25 is located on an axis X (hereinafter referred to as "X-axis") perpendicular to the Y-axis and centered across the cutting conveyor 4. The cutter rail 25 can be moved forwards and rearwards in the moving direction A of the cutting conveyor 4 with respect to the reference point 01. Also, the cutter rail 25 is rotatable about a vertical axis through the reference point 01 as shown in FIG. 2 so that the angle of the cutter rail 25 with respect to the moving direction A can be changed. A nut 35 is attached to the cutter rail 25 engaged on shaft 27 rotatable about a vertical axis passing through a point 02. The cutter-rail angle adjusting screw shaft 27 is rotatably screwed in the nut 35. A motor 29 is attached to the cutter base 24 to drive the shaft 27 about its vertical axis passing through a point 03.

From a relationship between distances 11, 12, and 13 between the points 01, 02, and 03 are the set bias angle $\theta$, and the fact that the distances 11 and 12 are constant, the distance 13 is calculated based on the Cosine Theorem. The pulse generator 28 applies feedback to the motor 29 based on this calculated distance 13 so as to rotate the cutter rail 25 about the vertical axis passing through the point O1 by this set bias angle $\theta$.

In addition, the cutter rail 25 is provided with a presser for pressing a side edge of the rubbered strip 1. The presser, being not shown in the drawings, is movable in a vertical direction.

Figure 4:
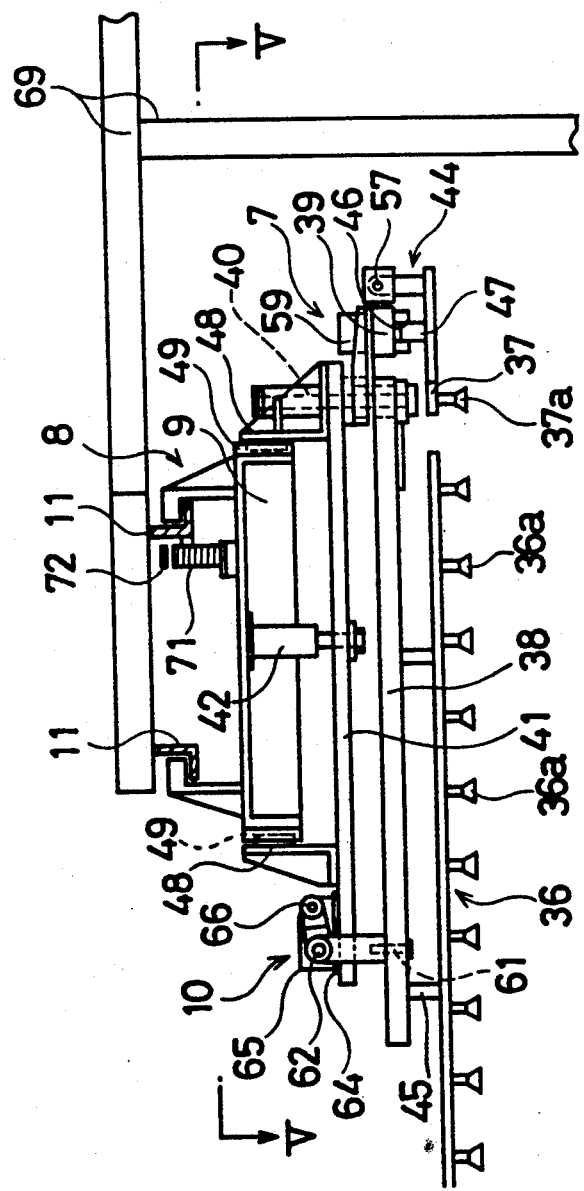
FIG. 4 is an enlarged sectional view taken along the line IV—IV in FIG. 3, a part being omitted for clarification.
Figure 5:
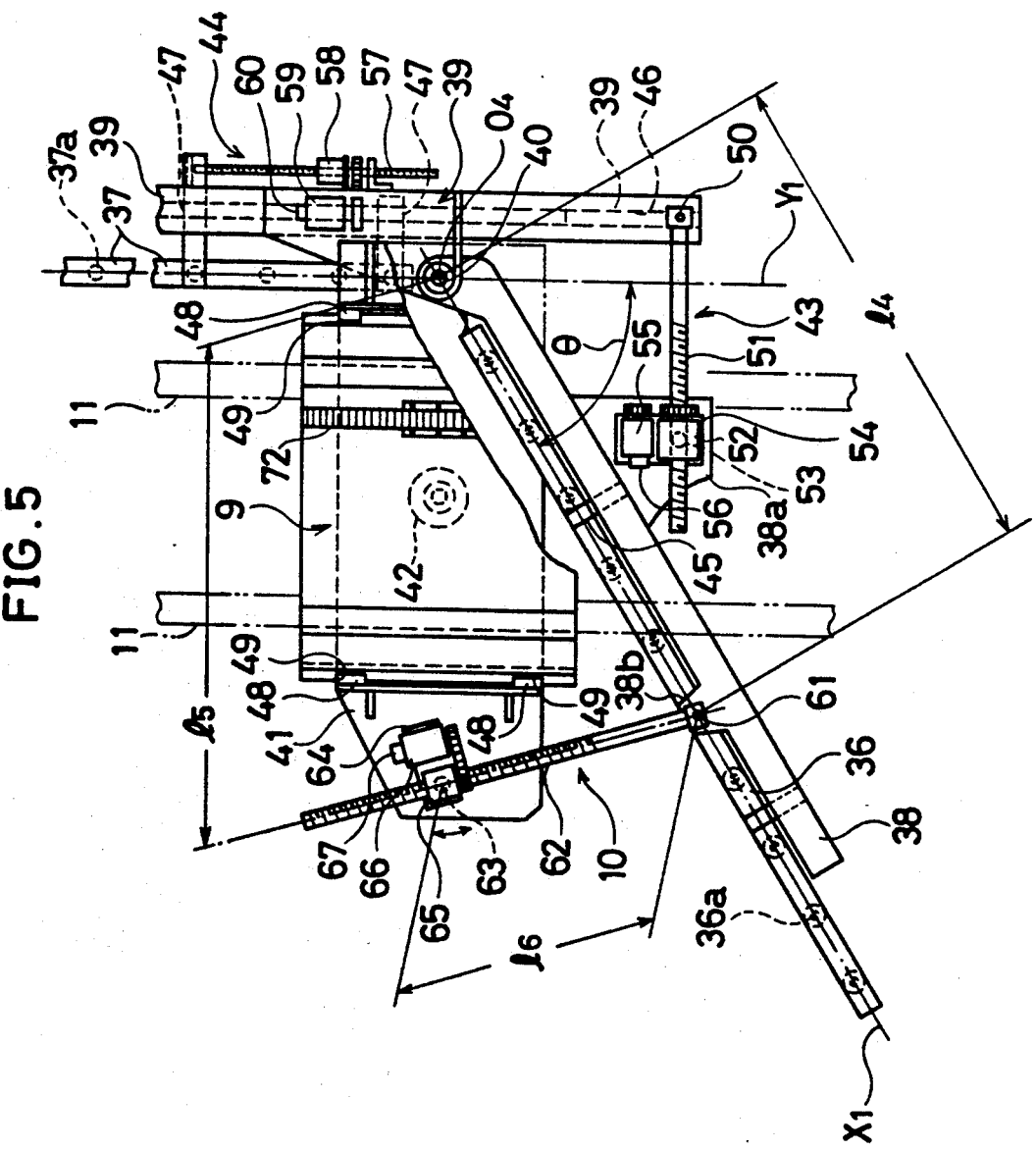
FIG. 5 is a partially broken plane view of the suction holding means and the transfer means viewed on the line V—V in FIG. 4.

The suction holding means 7, as shown in FIGS. 4 and 5, includes a first suction holding member 36 having a great number of suction pads 36a and disposed in a direction of an axis X1, a second suction holding member 37 having a great number of suction pads 37a and disposed in a direction of an axis Y1. A first support member 38 supports the first suction holding member 36, and a second support member 39 supports the second suction holding member 37. A pivot shaft 40 provides pivotal support for base portions of the first and second support members 38, 39. A support plate 41 supports the pivot shaft 40 and a cylinder 42 is attached to the carriage 9 for elevatably holding the support plate 41. Angle changing means 43 allows changing of the angle (180°-$\theta$) between the first and second holding members 36, 37, and suction position adjusting means 44 are provided for adjusting the position of the second holding member 37 in the direction of the Y1-axis.

The suction pads 36a, 37a are provided in lines on the first and second suction holding members 36, 37 so as to lie on the X1-axis and Y1-axis respectively. Base ends of the support arms 38, 39 are formed with holes which locate on both X1-axis and Y1-axis. The pivot shaft 40 is engaged through the holes so that the support arms 38, 39 are rotatable about the pivot shaft 40 in a horizontal plane parallel to the surface of the cutting conveyor 4.

The first suction holding member 36 is supported on the first support arm 38 by hanger members 45 which are vertically extendible. The second suction holding member 37 is supported on the second support arm 39 by a slidable guide 47 slidable in a guide groove 46 formed in the underside of the second support arm 39, so that the second suction holding member 37 is movable in a direction parallel to the Y1-axis. The second suction holding member 37 is driven in accordance with the cutting length L by the suction position adjusting means 44. When the second holding member 37 is positioned above the cutting conveyor 4, the Y1-axis of the second holding member 37 is parallel to the Y-axis and in agreement with the side edge 1a of the rubbered strip 1.

The support plate 41 includes sliding guides 48 vertically provided at both ends of its upper surface in the X-axis direction. The sliding guides 48 are vertically movable along vertical guide grooves 49 provided at both end portions of the carriage 9.

The angle change means 43 includes a screw shaft 51 horizontally rotatably mounted on an end portion of the second support arm 39 by a vertical pin 50, a rotatable nut 52 in which the screw shaft 51 is engaged, a motor base 54 provided on a plate 38a attached to the first support arm 38 being rotatable about a vertical shaft 53, a nut drive motor 55 provided on the motor base 54, and a pulse generator 56 directly coupled with the motor 55. The second suction holding member 37 is moved relative to the first suction holding member as follows. The center-to-center distance between the vertical pin 50 and the vertical shaft 53 is calculated based on a set angle of the first axis (X1-axis), i.e. the bias angle. The pulse generator 56 applies feedback to the motor 55 so that the angle (180°-$\theta$) of the second axis (Y1-axis) with respect to the first axis (X1-axis) comes to the predetermined value.

The suction position adjusting means 44 includes a screw shaft 57 one end of which is secured to one of the sliding guides 47 parallel to the Y1-axis, a rotatable nut 58 rotatably mounted on the second support arm 39 and engaged on the screw shaft 57, a nut drive motor 59, and a pulse generator 60 directly coupled with the nut drive motor 59. The nut drive motor 59 is controlled so that the second suction holding member 37 moves to a position corresponding to the cutting length L for the rubbered strip 1 and then is stopped at the predetermined position in accordance with feedback from the pulse generator 60.

The angle change means 10 includes a screw shaft 62 rotatably mounted on a vertical pin 61 provided on a screw shaft mounting portion 38b provided just above the first axis (X1-axis) of the support arm 38. The vertical pin 61 has its axis in a vertical plane passing through the X1-axis. A motor base 64 is rotatably mounted on the support plate 41 with a vertical shaft 63, a rotatable nut 65 rotatably mounted on the motor base 64 with the axis of the rotatable nut 65 perpendicular to the axis of the vertical shaft 63, a nut drive motor 66, and a pulse generator 67 directly coupled with the nut drive motor 66.

The distance $l_6$ between the vertical pin 61 and the vertical shaft 63 is calculated based on the fact that a line connecting the axis of the pivot shaft 40 and the axis of the vertical shaft 63 is parallel to the X-axis and the distance $l_5$ between them and the distance $l_4$ between the pivot shaft 40 and the vertical pin 61 is constant. Accordingly, the first suction holding member 36 can be set at the set angle of $\theta$ in accordance with feedback from the pulse generator 67.

The unit sheet transfer means 8 includes the carriage 9 and the carriage rail 11. The carriage rail 11 is supported on carriage rail support frames 68, 69. Toothed transmission wheels 70, 71 are provided at the front end 11a and the rear end 11b of the carriage rail 11 with the axes of the wheels perpendicular to the carriage rail 11. A toothed transmission belt 72 passes over both wheels 70, 71, and a carriage traverse motor 74 is directly coupled with a pulse generator 73. A part of the transmission belt 72 is fixed to the carriage 9.

By this arrangement, the carriage 9 may be moved reciprocatingly over a distance $l_{10}$ between a unit sheet suction holding position on the cutting conveyor 4 to a unit sheet suction releasing position on the sheet joining conveyor 5. The motor 74 is controlled by feedback from the pulse generator 73 so as to stop the carriage 9 accurately in both positions. In this case, the carriage 9 is controlled so that the axis of the pivot shaft 40 of the suction holding means 7 moves along the Y-axis which is the reference coordinate axis in FIG. 6, and stopped at a fixed Pc on the sheet joining conveyor 5.

Figure 14:
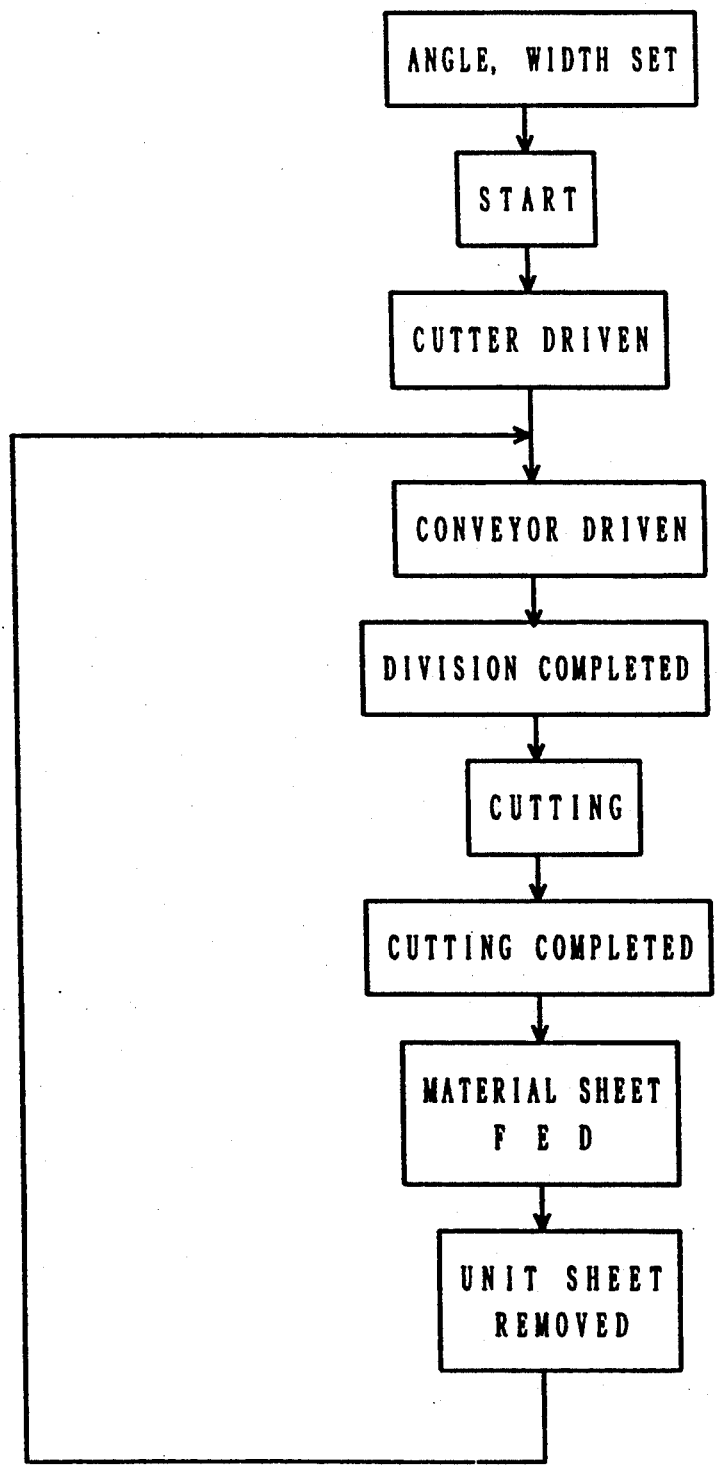
FIG. 14 is a flow chart showing the operational steps of the cutting means.
Figure 15A:
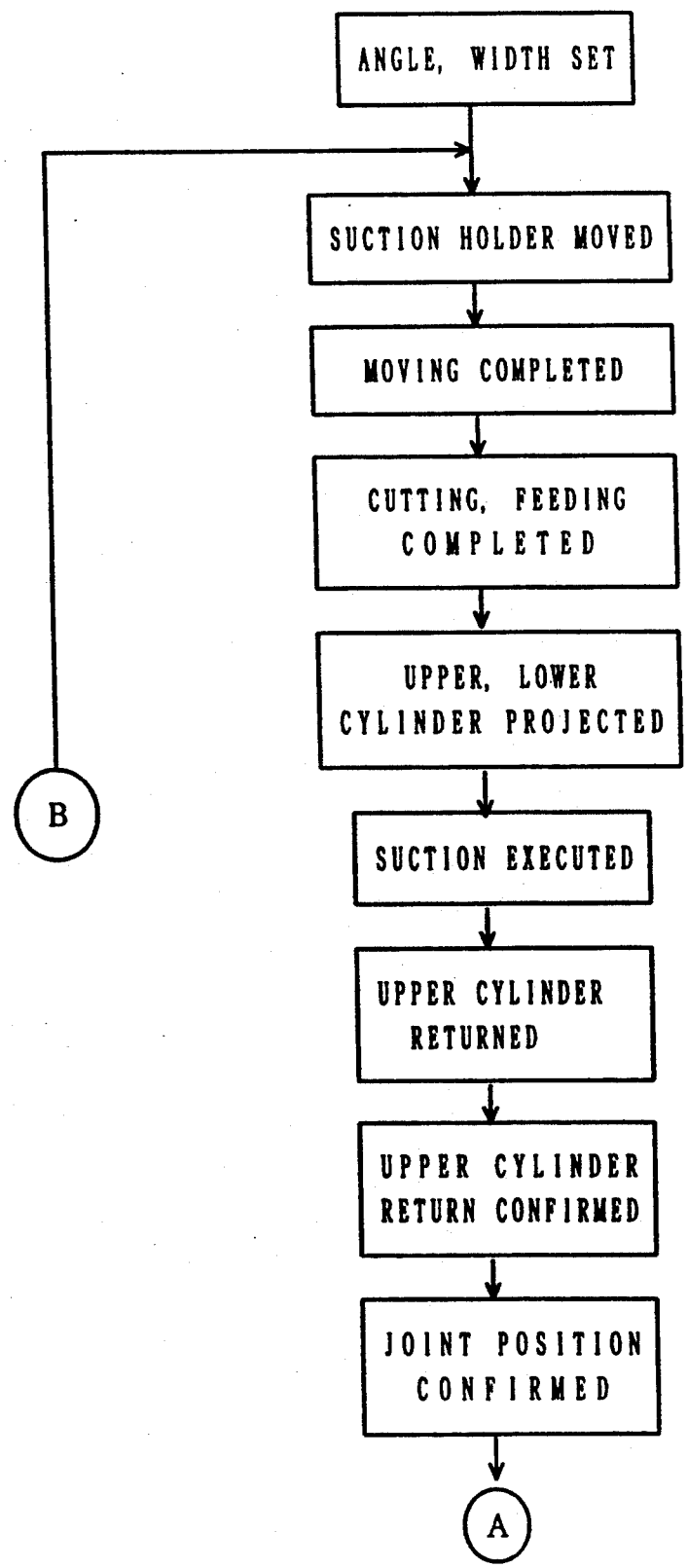
FIG. 15 is a flow chart showing the operational steps of the suction holding means.
Figure 15B:
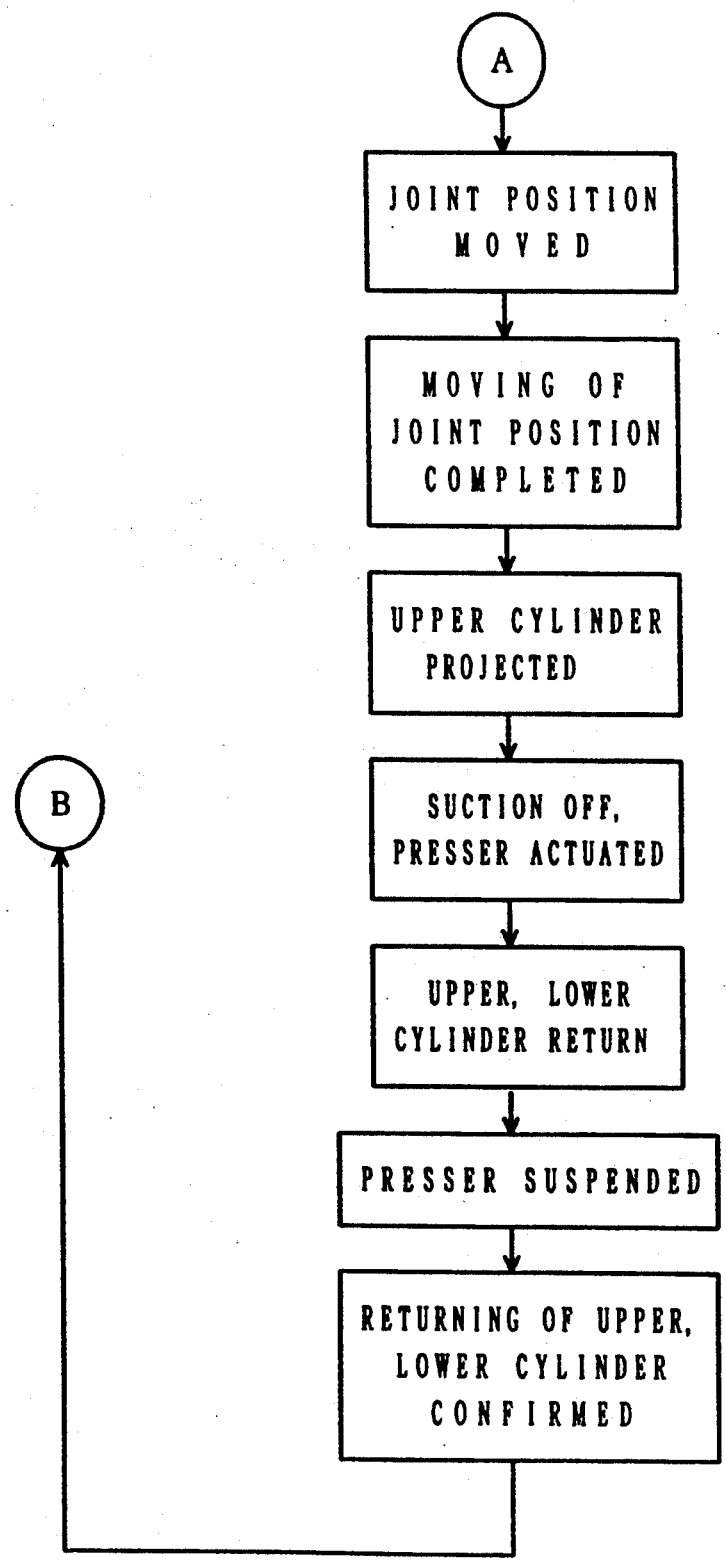
Figure 16:
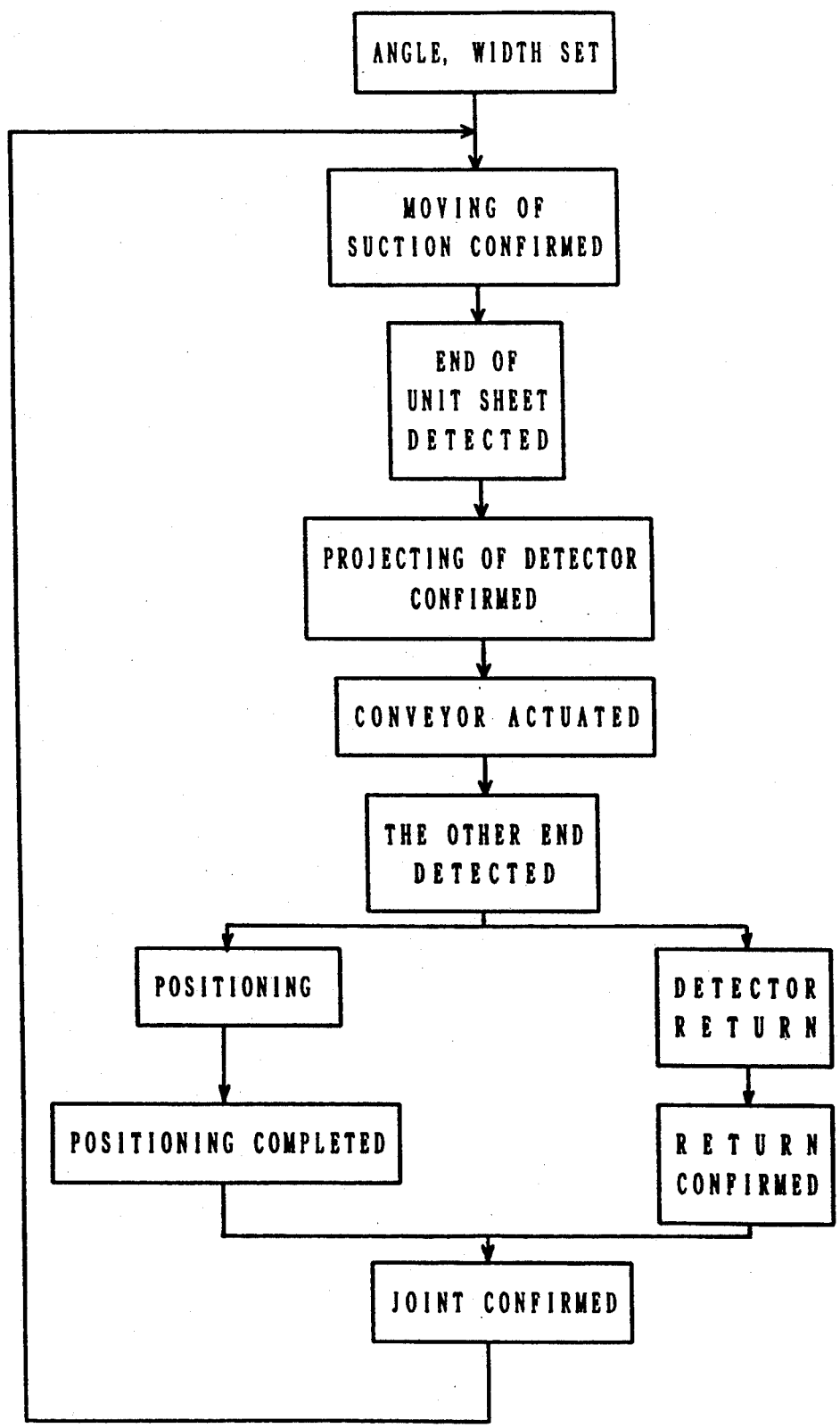
FIG. 16 is a flow chart showing the operational steps of the sheet joining conveyor.

Next, the operational steps of producing a biased belt sheet by the above-mentioned apparatus will be described with reference to FIGS. 14 to 16.

Figure 6:
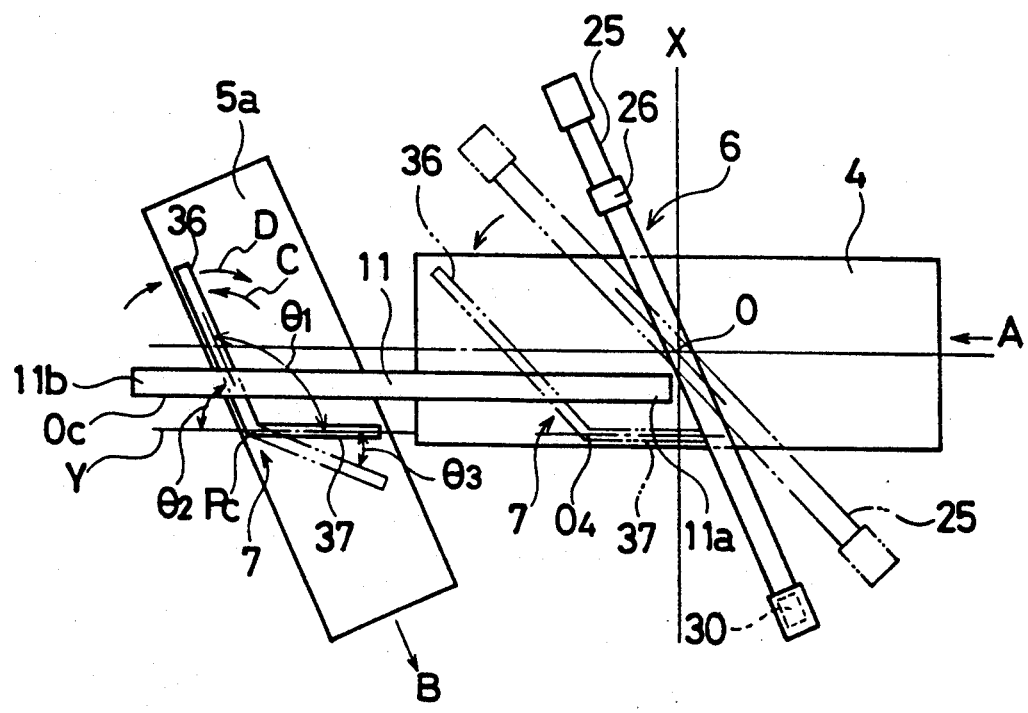
FIGS. 6 to 8 are schematic diagrams illustrating the operations of the apparatus.
Figure 7:
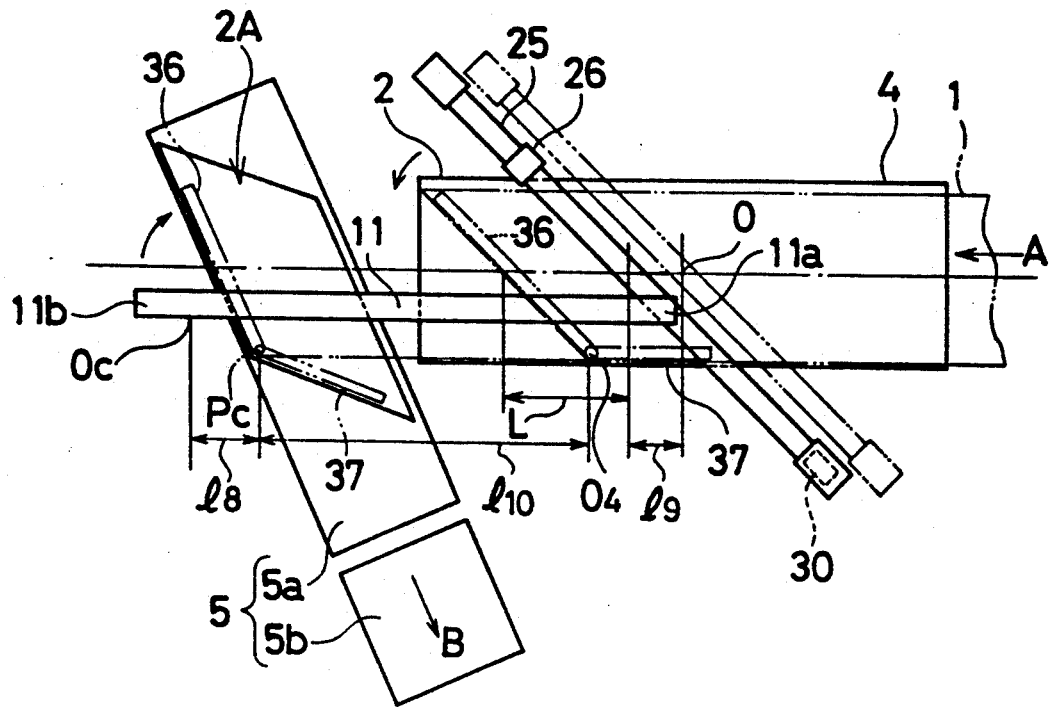
Figure 8:
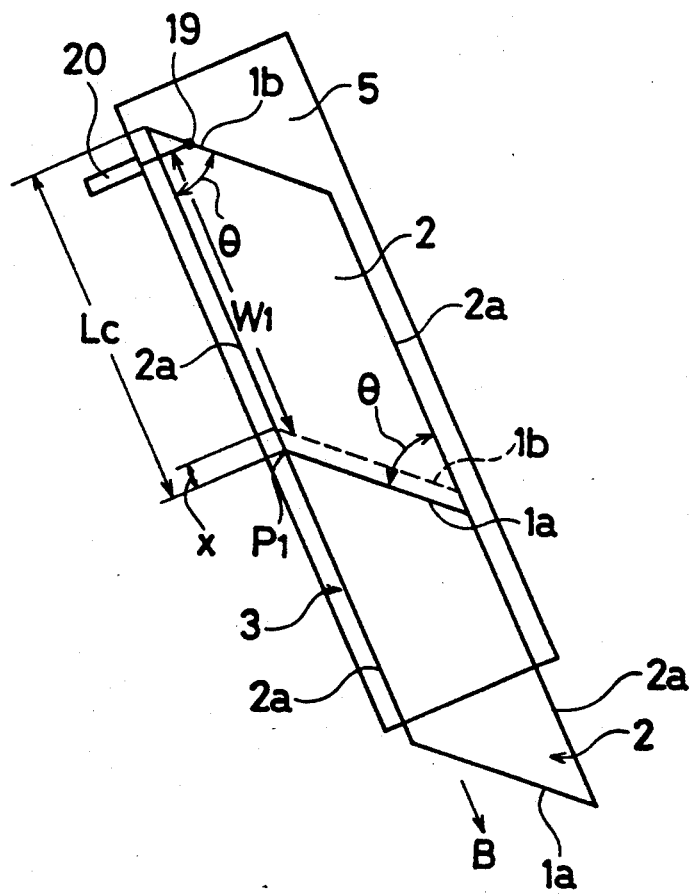

First, the bias cutting angle of the cutting means 6 is set at a predetermined angle, for example, 45 to 66 degrees, and the cutting length L (width of a biased belt sheet) is determined. As shown in FIGS. 6 and 7, the cutter rail 25 is positioned at the starting point O, and the carriage 9 is positioned at the starting point Oc. The axis line (Y1-axis) of the second suction holding member 37 is set parallel to the Y-axis. The included angle $\theta_1$ between the first suction holding member 36 and the second suction holding member 37 is set at an angle of (180°-$\theta_2$), wherein $\theta_2$ is the angle of the sheet joining conveyor 5 with respect to the cutting conveyor 4, for example, 66 degrees, as shown by the solid lines in FIG. 6.

Thereafter, the bias cutting angle $\theta$, e.g., 45 degrees, is inputted by a digital switch (not shown), and the calculation of the amount of movement needed is carried out by a sequencer. The angle of the cutter rail 25 with respect to the Y-axis is set at the bias cutting angle. The angle $\theta_3$ of the second suction holding member 37 with respect to the Y-axis is set at an angle of $\theta_3 = (\theta_2 - \theta)$. The cutter rail 25 is moved by a distance $l_9$ in the Y-axis direction by the motor 33 to set the cutting length L, as shown by solid lines in FIG. 7. The carriage 9 is advanced by a distance $l_8$ toward the cutter rail 25 to set the joining position. Consequently, the carriage 9 is reciprocatingly moved over the range 110 between the joining position and the unit sheet holding position.

The angle change means 10 is set so as to perform the following movements. The suction holding means 7 is rotated in the direction of arrow C by the angle $\theta 3 = (\theta 2 - \theta)$ so that the axis (Y1-axis) of the second suction holding member 37 becomes parallel to the Y-axis when the suction holding means 7 is moved from the joining position to the suction holding position. When the suction holding means 7 is moved from the suction holding position back to the joining position, the suction holding means 7 is rotated in the direction of the arrow D through an angle $\theta 3$ so that the axis (X1-axis) of the first suction holding menas 36 becomes parallel to the sheet joining conveyor 5.

Upon completion of the initial settings, the apparatus is started. The cutter 26 is set off to rotate, and the cutting conveyor 4 is driven to feed the rubbered strip 1 in the direction of the arrow A. After the rubbered strip 1 has moved by the cutting length L, the cutter 26 and the side edge presser are lowered and the cutting is started.

After the cutting is completed, the unit sheet 2 thus cut off and the following rubbered strip 1 are fed to a position where the cutter rail 25 and the carriage 9 will not interfere with them. Subsequently, the suction holding means 7 is lowered by the vertical cylinder 42, and the suction holding means 7 sucks both the cutting edge 2a and the side edge 1a of the unit sheet 2. Thereafter, the suction holding means 7 is raised holding the unit sheet 2. The cutter 26 is raised and then returned back to its starting position where the cutter 26 is held until the next cutting operation is to be started.

The suction holding means 7 holding the unit sheet 2 is then moved to the joining position on the sheet joining conveyor 5 together with the carriage 9 by the sheet transfer means 8. The suction holding means 7 is rotated in the direction of the arrow D by the angle change means 10.

When the suction holding means 7 reaches the joining position, the unit sheet 2 is adjusted to the joining position 2A, the suction holding member 7 is lowered to the sheet joining conveyor 5, and the suction is released so that the unit sheet 2 is transferred on to the sheet joining conveyor 5. Thereafter, the suction holding means 7 is again raised and is moved to the suction holding position on the cutting conveyor 4 to await the next unit sheet 2.

The forward end 1a of the unit sheet 2 on the sheet joining conveyor 5 is overlapped with the rear end 1b of the preceding unit sheet 2 by a joining length of x, and then adhered by adhesion means (not shown). Thereafter, the photoelectric detector 19 operates and the drive motor 15 is driven, so that the biased belt sheet 3 is moved in the direction of the arrow B. When the photoelectric detector 19 detects the rear end 1b, the pulse generator 16 applies feedback to the drive motor 15 so as to move the biased belt sheet 3 by a distance which is derived by subtracting both the joining length x and the initial movement from the length Lc of the cutting edge 2a of the unit sheet 2, and then the biased belt sheet 3 is stopped at the joining position. The photoelectric detector 19 is then retracted to its stand-by position by the cylinder 20.

As mentioned above, simple unit sheets 2 are joined with previous unit sheets 2, and pressed with the presser roller 21 on the second conveyor 5b so as to completely join the unit sheets 2 with each other to produce a continuous biased belt sheet 3, which is in turn fed intermittently and automatically.

It is possible that when the bias angle $\theta$ is equal to the tilting angle of the sheet joining conveyor 5 with respect to the cutting conveyor 4, (66 degrees in the embodiment), the angle change means 10 is fixed after the angle is adjusted to eliminate the need of rotating the suction holding means 7 between the joining position and the suction holding position.

Furthermore, as mentioned above, the bias angle $\theta$ may be changed by changing and adjusting the position and angle of the cutter rail 25, and the included angle between the first suction holding member 36 and the second suction holding member 37, and the others in order.

As described above, in the method and apparatus for producing a biased belt sheet according to the present invention, discrete unit sheets 2, which have been cut on the cutting conveyor 4 with cutting means 6, are transferred to the sheet joining conveyor 5 by the suction holding means 7 and transfer means 8. On the sheet joining conveyor 5, each unit sheet 2 is adjusted so that its cut edge 2a becomes parallel to the moving direction of the sheet joining conveyor 5, and then joined with one on another in succession by overlapping the forward end of the one unit sheet 2 with the rear end of the preceding unit sheet 2. In other words, unit sheets, cut in the form of a parallelogram are automatically joined with one another strictly by a joining length x. Consequently, a high quality biased belt sheet can be produced assuredly and efficiently, which thus can ensure an increased productivity, reduced manual operation, improved product quality, and so forth. Furthermore, the bias angle and the cutting length can be desirably set, which thus simplifies and facilitates the maintenance and reduces the problems of maintenance.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A method for producing a continuous sheet of biased cord material comprising the steps:

cutting a longitudinally-extending rubber strip having a number of cords embedded therein extending parallel to the longitudinal direction of the strip at a desired angle with respect to the longitudinal direction into unit sheets of a desired length each being in the form of a parallelogram, on a cutting conveyor, the cutting conveyor having a first direction of movement parallel to the longitudinal direction, by cutting means, said cutting means being inclinable at a biasing angle with respect to the first direction of movement of the cutting conveyor;

holding in turn each unit sheet with holding means and transferring in turn each unit sheet from the cutting conveyor to a sheet joining conveyor by moving said holding means with transfer means, said holding means including a first holding member, a second holding member, the first holding member and the second holding member having an included angle therebetween, and an angle changing means for changing the included angle between the first holding member and the second holding member, the angle changing means changing the included angle in accordance with a change in the biasing angle, the sheet joining conveyor having a second direction of movement, the first direction of movement and the second direction of movement lying on horizontal planes, and spatially intersecting each other;

positioning the unit sheet so that the cut edges of the unit sheet become parallel to the second direction of movement of the sheet joining conveyor, and adhering the forward end of the unit sheet to the rearward end of the preceding unit sheet to form a continuous sheet of biased cord material.

2. An apparatus for producing a continuous sheet of biased cord material comprising:

a cutting conveyor for feeding a longitudinally-extending rubber strip having a number of cords embedded therein extending parallel to the longitudinal direction of the strip, the cutting conveyor having a first direction of movement parallel to the longitudinal direction, the first direction of movement lying on a horizontal plane;

cutting means for cutting the rubber strip at the desired angle with respect to the longitudinal direction into unit sheets of a desired length each in the form of a parallelogram, said cutting means being inclinable with respect to the first direction of movement of the cutting conveyor;

holding means for holding the unit sheet, said holding means including a first holding member, a second holding member, the first holding member and the second holding member having an included angle therebetween, and an angle changing means for changing the included angle between the first holding member and the second holding member, the angle changing means changing the included angle in accordance with a change in the biasing angle;

moving means for moving the holding means from the cutting conveyor to a sheet joining conveyor;

the sheet joining conveyor provided in a position in the vicinity of a trailing end of the cutting conveyor and having a second direction of movement lying a horizontal plane and intersecting the first direction of movement of the cutting conveyor for joining ends of successive unit sheets to produce a continuous sheet of biased cord material.

3. The apparatus according to claim 2 wherein the angle change means enables the longitudinal direction of the unit sheet to be the same as the second direction of movement of the sheet joining conveyor.

4. The apparatus according to one of claims 2 or 3 wherein the first holding member and the second holding member being rotatable about a vertical axis, and each of the holding members having a plurality of suction pads at a predetermined interval in a longitudinal direction thereof.

5. The apparatus according to one of claims 2 or 3 further comprising a sheet presser roller provided over the sheet joining conveyor for pressing the joining region of the continuous sheet of biased cord material being formed.

6. The apparatus according to claim 4 further comprising a sheet presser roller provided over the sheet joining conveyor for pressing the joining region of the continuous sheet of biased cord material being formed.

* * * * *